US008962715B2

(12) United States Patent
Engelhardt et al.

(10) Patent No.: US 8,962,715 B2
(45) Date of Patent: Feb. 24, 2015

(54) STABILIZED AQUEOUS POLYMER COMPOSITIONS AND THEIR USE

(75) Inventors: Friedrich Engelhardt, Frankfurt (DE); Werner Spielmann, Kelkheim (DE); Christian Bremer, Bad Soden Salmünster (DE); Anja Obermüller, Bruchkööel (DE); Joachim Christian, Rödermark (DE)

(73) Assignee: Tougas Oilfield Solutions GmbH, Frankfurt (DE)

( * ) Notice: Subject to any disclaimer, the term of this patent is extended or adjusted under 35 U.S.C. 154(b) by 1235 days.

(21) Appl. No.: 12/586,051

(22) Filed: Sep. 16, 2009

(65) Prior Publication Data
US 2010/0075871 A1 Mar. 25, 2010

(30) Foreign Application Priority Data
Sep. 22, 2008 (EP) .................... 08016641

(51) Int. Cl.
| | | |
|---|---|---|
| C08K 3/30 | (2006.01) | |
| C08K 5/46 | (2006.01) | |
| C08K 5/47 | (2006.01) | |
| C09K 8/08 | (2006.01) | |
| C09K 8/12 | (2006.01) | |
| C09K 8/68 | (2006.01) | |
| C09K 8/588 | (2006.01) | |
| C09K 8/035 | (2006.01) | |
| C09K 8/467 | (2006.01) | |
| C09K 8/508 | (2006.01) | |
| C09K 8/72 | (2006.01) | |
| C10M 161/00 | (2006.01) | |
| C10M 173/00 | (2006.01) | |
| C23F 11/173 | (2006.01) | |
| C08F 220/58 | (2006.01) | |

(52) U.S. Cl.
CPC ............. *C09K 8/588* (2013.01); *C09K 8/035* (2013.01); *C09K 8/467* (2013.01); *C09K 8/508* (2013.01); *C09K 8/68* (2013.01); *C09K 8/685* (2013.01); *C09K 8/72* (2013.01); *C10M 161/00* (2013.01); *C10M 173/00* (2013.01); *C10M 2205/024* (2013.01); *C10M 2205/06* (2013.01); *C10M 2209/02* (2013.01); *C10M 2209/04* (2013.01); *C10M 2209/08* (2013.01); *C10M 2209/084* (2013.01); *C10M 2209/103* (2013.01); *C10M 2209/12* (2013.01); *C10M 2217/02* (2013.01); *C10M 2217/024* (2013.01); *C10M 2217/06* (2013.01); *C10M 2219/104* (2013.01); *C10M 2221/02* (2013.01); *C10M 2225/02* (2013.01); *C10N 2220/021* (2013.01); *C10N 2220/022* (2013.01); *C10N 2230/06* (2013.01); *C10N 2230/08* (2013.01); *C10N 2240/40* (2013.01); *C10N 2260/09* (2013.01); *C10N 2260/10* (2013.01); *C10N 2260/12* (2013.01); *C23F 11/173* (2013.01); *C08F 220/58* (2013.01)
USPC ................... 524/83; 524/35; 524/47; 524/56; 524/418; 407/110; 407/111; 407/113; 407/114; 407/120; 407/211; 407/212; 407/213; 407/215; 407/216; 407/225; 407/269

(58) Field of Classification Search
USPC .......... 524/418, 35, 47, 56, 83; 507/110, 111, 507/113, 114, 120, 211, 212, 213, 215, 216, 507/225, 269
See application file for complete search history.

(56) References Cited

U.S. PATENT DOCUMENTS

| | | | | |
|---|---|---|---|---|
| 4,507,440 A * | 3/1985 | Engelhardt et al. | ........... | 525/218 |
| 4,661,266 A | 4/1987 | Kanda et al. | ............... | 252/8.551 |
| 4,686,052 A | 8/1987 | Baranet et al. | ............. | 252/8.551 |
| 4,721,577 A | 1/1988 | Kanda et al. | ............... | 252/8.551 |
| 4,795,575 A | 1/1989 | Southwick et al. | ........... | 252/8.554 |
| 4,801,389 A | 1/1989 | Brannon et al. | ........... | 252/8.551 |
| 4,928,766 A | 5/1990 | Hoskin | ........................ | 166/270 |
| 5,103,913 A | 4/1992 | Nimerick et al. | ............. | 166/308 |
| 5,922,087 A * | 7/1999 | Nishioka et al. | .................. | 8/527 |
| 7,060,661 B2 * | 6/2006 | Dobson et al. | ................. | 507/245 |
| 7,670,513 B2 * | 3/2010 | Erdner et al. | ................. | 252/610 |
| 7,828,858 B2 * | 11/2010 | Cremer et al. | .................... | 8/405 |
| 2003/0092581 A1 | 5/2003 | Crews | ........................... | 507/100 |
| 2005/0148475 A1 | 7/2005 | Maresh et al. | ................. | 507/111 |
| 2006/0027364 A1 | 2/2006 | Kelly et al. | .................... | 166/278 |
| 2006/0059635 A1 * | 3/2006 | Alpert | ................................ | 8/554 |
| 2006/0157668 A1 * | 7/2006 | Erdner et al. | ..................... | 252/2 |
| 2008/0194434 A1 | 8/2008 | Huff et al. | ..................... | 507/221 |

FOREIGN PATENT DOCUMENTS

| | | | | |
|---|---|---|---|---|
| CA | 2 467 791 | 11/2004 | ............... | C09K 7/02 |
| DE | 1 089 173 | 9/1960 | ............. | C08F 25/01 |
| DE | 24 32 699 | 1/1976 | ............. | C08F 20/56 |
| DE | 33 12 711 | 10/1983 | ............. | C08F 2/32 |
| DE | 35 20 507 | 12/1985 | ............. | C08F 2/30 |
| GB | 1143278 | 2/1969 | ............. | C08F 45/58 |
| GB | 1 332 988 | 10/1973 | ............. | C07D 27/10 |
| WO | WO 97/04038 | 2/1997 | ............. | C09K 7/06 |

OTHER PUBLICATIONS

Kirk-Othmer, vol. 22, 3rd edition (1983) on pp. 168 to 183.

* cited by examiner

*Primary Examiner* — Kriellion Sanders

(74) *Attorney, Agent, or Firm* — Michael W. Ferrell; Ferrells, PLLC; Anna L. Kinney

(57) ABSTRACT

Disclosed are stabilized aqueous polymer compositions containing A) a stabilizing amount of a least a sulfur dye or containing a stabilizing amount of a sulfur dye with a compound comprising a heterocyclic system containing nitrogen and sulphur as ring heteroatoms and B) at least one polymer comprising groups which are capable of complex formation with ions. The aqueous polymer compositions are stabilized against thermal or other degradation processes of the polymer by addition of component A) to allow their use even under harsh conditions.

23 Claims, No Drawings

STABILIZED AQUEOUS POLYMER COMPOSITIONS AND THEIR USE

CLAIM FOR PRIORITY

This application is based upon European Patent Application No. EP 08016641.6, entitled, "Stabilized Aqueous Polymer Compositions and Their Use", filed Sep. 22, 2008. The priority of European Patent Application No. EP 08016641.6 is hereby claimed and its disclosure incorporated herein by reference in its entirety.

TECHNICAL FIELD

The present invention relates to stabilized polymer compositions especially useful as a well treatment fluid and to a method of stabilizing a well treatment fluid. More particularly, the present invention relates to a stabilized well treatment fluid and a method of stabilizing a well whereby a reduction in rheological properties of the well treatment fluid at high temperatures is prevented, thereby permitting smoothly carrying out a well treatment operation.

BACKGROUND

The aqueous polymer compositions are stable at high temperatures against thermal, chemical and mechanical degradation. The new compositions are useful for tertiary recovery processes, in drilling muds and cementing additives, as completion fluid viscosifiers, as friction reducers, for water control purposes, for hydraulic fracturing and acidizing processes, for lubrication additives, corrosion inhibitors, metal working fluids, mining, and protective colloids.

There have been several attempts of aqueous polymer compositions stabilized against degradation.

United States Patent Application Publication No. 2006/0027364 discloses an aqueous, viscoelastic treating fluid gelled with a crosslinked guar or guar derivative. The viscosity of this treating fluid and the thermal stabilization is improved by addition of a glycol.

U.S. Pat. No. 5,103,913 discloses aqueous fracturing fluids with improved temperature stability. These fluids contain guar gelling agent and a soluble bicarbonate. As shown in the patent examples these fluids are applicable for operations in the temperature range between 175° C. and 210° C.

U.S. Pat. No. 4,801,389 discloses aqueous fracturing fluids with improved temperature stability. These fluids contain guar gelling agent, zirconium or hafnium crosslinking agent and a bicarbonate salt. These fluids are applicable for operations in the temperature range between 80 and 120° C.

U.S. Pat. No. 4,721,577 discloses stabilized fracturing fluids with improved temperature stability. These fluids contain guar gelling agent and thiol derivatives of selected heterocyclic compounds. These fluids are applicable for operations in the temperature range between 90 and 200° C.

U.S. Pat. No. 4,686,052 discloses gels derived from solvatable polysaccharides and crosslinked with titanium or zirconium compounds. These gels are stabilized against shear degradation at elevated temperature by addition of an alkanolamine.

Canadian Publication No. 2,467,791 discloses dry blended particulate compositions for well treating comprising a particulate hydratable polysaccharide, a particulate crosslinking agent, a particulate base and a particulate sodium, potassium or ammonium pyrophosphate or oxalate. As a thermal stabilizer sodium thiosulfate is proposed.

WIPO Publication No. WO 97/04038 discloses a drilling fluid comprising a selected base fluid and at least one additive. The base fluid is a synthetic fluid. Heat stabilization or addition of heat stabilizers is not disclosed.

U.S. Pat. No. 4,661,266 discloses a completion fluid comprising a polymer, hydroxyethyl cellulose, and a stabilizer. The stabilizer is benzothiazole or a thiadiazole derivative. Said composition exhibits a superior stability of the rheological properties under elevated temperatures. The tested temperature is 110 to 130° C.

U.S. Pat. No. 4,795,575 discloses a stabilized polymer thickened aqueous composition used in an oil recovery process, based on the use of mercaptobenzothiazole as stabilizer. The polymers used are partially hydrolyzed polyacrylamide polymers or copolymers. The pH of the aqueous composition is between 10 and 13. The applied temperature is between 50 and 80° C.

In the last years, commercially successful exploration of subterranean deposits has become more difficult because the subterranean deposits are prospected in a deeper stratum. For this reason, the temperature of the stratum tends to rise and, in many cases, it reaches 150° C. or more. At such high temperatures, the applied polymers deteriorate, for example by thermal, chemical or physical stress degradation. This leads to a reduction in rheological properties of the aqueous polymer composition and creates a serious obstacle in high temperature applications. Accordingly, the inherent functions of the aqueous polymer composition fluid can be satisfactorily obtained only if degradation (e.g., caused by decomposition) of its rheological and chemical properties can be prevented even at elevated temperatures.

It would be desirable if a composition and method could be devised to stabilize and enhance the performance of aqueous polymer compositions such as used in drilling muds and for tertiary recovery.

The present invention is intended to overcome the above problems and an object of the present invention is to provide stabilized aqueous polymer compositions.

SUMMARY OF INVENTION

It has been found that the above described object can be attained by adding at least a sulfur dye as a stabilizer or a mixture of said sulfur dye with a compound comprising a heterocyclic system containing nitrogen and sulfur as ring heteroatoms to a polymer as hereinafter defined.

Surprisingly it was found that the addition of small amounts of a sulfur dye or of a combination of selected stabilizers is very effective to stabilize aqueous polymer compositions against degradation to maintain their chemical and rheological properties even under harsh conditions.

The present invention is directed to a stabilized aqueous polymer composition containing:
  A) a stabilizing amount of at least a sulfur dye; and
  B) at least one polymer comprising groups which are capable of complex formation with ions.

The stabilizer used in the compositions of this invention comprises a sulfur dye. This means that a sulfur dye or a mixture of sulfur dyes can be used. In addition, said sulfur dye can be used together with other heterocyclic compounds containing nitrogen and sulfur as ring heteroatoms.

In one embodiment of the invention the sulfur dye or the combination of sulfur dye and another compound comprising a heterocyclic system containing nitrogen and sulfur as ring heteroatoms are contained in a polymer solution either in dissolved form or suspended form.

In an alternative embodiment of the invention, said sulfur dye or said combination of said sulfur with said other compound comprising a heterocyclic system containing nitrogen and sulfur as ring heteroatoms are present in a water-in-oil emulsion. In these emulsions the major part or even the total amount of the polymer is present in the water-containing portion of the emulsion. The oil-part of the emulsion is formed from a fluid which is liquid at 25° C. and which does not dissolve in water but forms an emulsion, preferably in combination with conventional emulsifiers. Examples of said fluid are liquid hydrocarbons, higher alcohols, higher phenols, and higher ketones, higher alkyl esters which are not or are only sparingly soluble in water. These water-in-oil emulsions can be used to prepare the aqueous polymer solutions referred to above.

In still an alternative embodiment of the invention said polymer and said sulfur dye or said combination of said sulfur dye with said other compound comprising a heterocyclic system containing nitrogen and sulfur as ring heteroatoms are suspended or dispersed in a non-water miscible organic solvent. In these dispersions the major part or even the total amount of the polymer and the sulfur dye stabilizer or the combination of the sulfur dye stabilizer with said other compound comprising a heterocyclic system containing nitrogen and sulfur as ring heteroatoms are present in solid particulate form and are dispersed or suspended in said fluid, preferably in an organic medium being liquid at 25° C. that is soluble or non-soluble in water.

Examples of said liquid organic medium are hydrocarbons, alcohols, phenols, ketones, preferably lower alkyl alcohols and/or polyalkylene glycols, such as polyethylene glycol or propylene glycol. These dispersions can be used to prepare the aqueous polymer solutions or the water-in-oil emulsions referred to above.

In still an additional embodiment of the invention a solid formulation of said polymer in particulate solid form, such as in powder or granular form, containing the sulfur dye or containing a combination of the sulfur dye with said other compound comprising a heterocyclic system containing nitrogen and sulfur as ring heteroatoms is provided. These solid formulations can be used to prepare the aqueous polymer solutions or the water-in-oil emulsions referred to above.

DETAILED DESCRIPTION

The invention is described in detail below with reference to numerous examples which are presented for purposes of illustration only. The spirit and scope of the invention is set forth in the appended claims.

The polymer used in aqueous polymer compositions of the present invention contains groups which are capable of complex formation with ions, preferably multivalent metal ions.

Said polymer can have any molecular weight which renders said polymer suitable for the envisaged use. Preferably the polymer has a molecular weight of at least 10,000 Dalton, most preferably of at least $10^5$ Dalton, and especially preferred between $4 \times 10^5$ and $1 \times 10^8$ Dalton. If crosslinked polymers are used three dimensional networks are formed. The crosslinking density has to be chosen in a manner to allow the crosslinked polymer to form a homogeneous phase with water. This can be achieved by using small amounts of crosslinking monomers.

Typical polymers include, but are not necessarily limited to, solvatable cellulose derivatives and to synthetic polymers with functional groups that can be crosslinked via ionic components.

The hydratable polymer that is useful in the present invention can be, but is not necessarily limited to, any of the hydratable polysaccharides having galactose or mannose monosaccharide components. These polysaccharides are capable of gelling in the presence of a crosslinking agent to form a gelled fluid, and while crosslinking is not absolutely necessary, it is expected that in many cases the polymer will be crosslinked. For instance, suitable hydratable polysaccharides include starch or its derivatives, galactomannan gums, glucomannan gums, cellulosic derivatives, preferably carboxymethyl cellulose; cellulose ether, preferably hydroxyethyl cellulose; guar gums or its derivatives, preferably guar gum ether; alginates, carrageenans, tragacanth gums, glucan gums and xanthan gums.

Guar derivatives are defined herein as guar gum reacted with a compound having a different functional group than guar. In one non-limiting embodiment, other derivatives can be hydroxyalkyl guar, carboxyalkyl guar, and carboxyalkyl hydroxyalkyl guar or hydrophobically modified guar.

There are numerous examples available of synthetic polymers with functional groups that can be crosslinked via ionic components.

The use of synthetic polymers in aqueous solution of the present invention is preferred.

Preferably water-soluble homo- and/or copolymers with functional groups that can be crosslinked via ionic components are used. Among this group, the use of water-soluble copolymers is preferred. Examples of such copolymers are disclosed in U.S. Pat. Nos. 4,309,523; 4,357,245; 4,451,631; 4,499,232; 4,500,437; 4,507,440; 4,551,513; and 5,735,349.

These copolymers are produced via various polymerization processes, e.g. by polymerizing aqueous monomer solutions by precipitation polymerization or by inverse emulsion polymerization, the latter being the preferred process. The polymerization reaction can be initiated by redox systems, azo initiators or radiation. At the location of use these products or their precursors are dissolved to form aqueous solutions, emulsions, gels or foams. The polymer content of an aqueous solution in applicable form is typically in the range of 0.01 to 10% by weight, preferably about 0.05 to 5% by weight. Emulsions, preferably water-in-oil (W/O) emulsions as concentrated precursors can carry much higher contents of the polymer. The water-in-oil emulsions can be transformed into aqueous solutions by adding said emulsions to a stirred waterphase, such as disclosed in U.S. Pat. No. 4,299,755.

German Publication Nos. 35 20 507; 1,089,173; 33 12 711; and 24 32 699 disclose inverted microlatices of water-soluble copolymers obtainable by copolymerization of water-soluble monomers which are emulsified by means of emulsifiers in an organic phase. U.S. Pat. No. 4,521,317 discloses transparent and stable microlatices dispersed in water which can be used in oil production.

Preferred synthetic polymers for use in the stabilized aqueous solutions, emulsions or particulate solid mixtures of this invention are copolymers derived from copolymerization of at least two of:
  i) an amide of an ethylenically unsaturated carboxylic acid; and/or
  ii) an ethylenically unsaturated phosphonic acid; and/or
  iii) an ethylenically unsaturated sulfonic acid; and/or optionally
  iv) an ethylenically unsaturated carboxylic acid; and/or optionally
  v) an allyl- and methallyl compound; and/or optionally
  vi) an additional copolymerizable monomer.

As the use of copolymers is preferred, there are preferred compositions concerning the mixing ratio of monomers mentioned above.

The proportion of monomers i), referring to the total amount of monomers, is in general between 20 and 90% by weight, preferably between 30 and 80% by weight.

The proportion of monomers ii), referring to the total amount of monomers, is in general between 0.1 and 20% by weight, preferably between 0.2 and 10% by weight.

The proportion of monomers iii), referring to the total amount of monomers is in general between 9 and 80% by weight, preferably between 25 and 60% by weight.

The proportion of monomers iv), referring to the total amount of monomers is in general between 0 and 20% by weight, preferably between 0 and 10% by weight.

The proportion of monomers v), referring to the total amount of monomers is in general between 0 and 20% by weight, preferably between 0 and 10% by weight.

The proportion of monomers vi), referring to the total amount of monomers is in general between 0 and 20% by weight, preferably between 0 and 10% by weight.

The preferred synthetic copolymers for use in the fluids of this invention typically have molecular weights characterized by K-values between 50 and 750, preferably between 150 and 350.

Preferably synthetic copolymers are used which are derived from 30 to 80% by weight of monomers i), from 0.1 to 10% by weight of monomers ii), from 25 to 60% by weight of monomers iii) and from 0 to 10% by weight of monomers iv).

Very preferably used are copolymers derived from the following combination of monomers:
- at least one amide of an ethylenically unsaturated carboxylic acid, at least one ethylenically unsaturated phosphonic acid and at least one ethylenically unsaturated sulfonic acid;
- at least one amide of an ethylenically unsaturated carboxylic acid, at least one ethylenically unsaturated phosphonic acid, at least one ethylenically unsaturated sulfonic acid and at least one ethylenically unsaturated carboxylic acid;
- at least one amide of an ethylenically unsaturated carboxylic acid, at least one ethylenically unsaturated phosphonic acid, at least one ethylenically unsaturated sulfonic acid, and at least one N-vinylamide;
- at least one amide of an ethylenically unsaturated carboxylic acid, at least one ethylenically unsaturated phosphonic acid, at least one ethylenically unsaturated sulfonic acid, at least one ethylenically unsaturated carboxylic acid, and at least one N-vinylamide;
- at least one amide of an ethylenically unsaturated carboxylic acid, at least one ethylenically unsaturated phosphonic acid, at least one ethylenically unsaturated sulfonic acid, at least one ethylenically unsaturated carboxylic acid, and at least one allylamine; and
- at least one amide of an ethylenically unsaturated carboxylic acid, at least one ethylenically unsaturated phosphonic acid, at least one ethylenically unsaturated sulfonic acid, at least one ethylenically unsaturated carboxylic acid, and at least one N-dialkyl alkanolamine.

Further, the copolymers besides the sulfonic, phosphonic or carboxylic acid groups may contain additional crosslinkable groups, such as amidocarbonyl groups, or may contain further groups, which can be crosslinked by the action of bifunctional compounds reacting with said groups. These reactions can form swellable polymer networks or crosslinked polymers showing higher viscosity. Examples thereof are found in U.S. Pat. No. 4,499,232.

Examples of amides of ethylenically unsaturated carboxylic acids i) are amides of ethylenically unsaturated carboxylic acids with one or two carboxylic acid groups, at least one carboxylic acid group carrying an amide group. Preferred monomers of this type are the amide of acrylic acid, the amide of methacrylic acid, the mono- or bis-amide of fumaric acid, the mono- or bis-amide of maleic acid or the mono- or bis-amide of itaconic acid. Preferred are the amides of acrylic acid or of methacrylic acid.

These amides can be also used in the form of their N-functionalized derivates, such as N-alkyl derivatives or N-methylol derivatives. Examples of said monomers are N-methylolacrylamide, N-methylolmethacrylamide, N-methylacrylamide, N-methylmeth-acrylamide, N-tert-butylacrylamide or N-tert.-butylmethacrylamide. Examples for ethylenically unsaturated phosphonic acids ii) are vinyl phosphonic acid or its alkaline- or ammonium salts.

Examples for ethylenically unsaturated sulfonic acids iii) are vinyl sulfonic acid, 2-acrylamido-2-methylpropane-sulfonic acid ("AMPS"), 2-methacrylamido-2-methylpropane-sulfonic acid, styrene sulfonic acid, allyl sulfonic acid, methallyl sulfonic acid or their alkali metal salts or ammonium salts.

Examples for ethylenically unsaturated carboxylic acids iv) are ethylenically unsaturated compounds with one or two carboxylic acid groups or their anhydrides and/or their salts. Preferred monomers of this type are acrylic acid, methacrylic acid, fumaric acid, maleic acid, itaconic acid, crotonic acid and its salts and anhydrides. Preferred are acrylic acid or methacrylic acid as well as their corresponding alkali metal salts or ammonium salts.

Examples of allyl- and methallyl compounds v) are allylamines, such as N-dimethyl-N-diallylammoniumchloride, dimethylallylamine and allylalcohols.

Examples for further copolymerisable monomers vi) are compounds which do not adversely affect the solubility of the copolymer in water and which optionally award a further desired property to the copolymer. Examples for monomers of this type are esters of ethylenically unsaturated carboxylic acids, such as alkylesters of acrylic acid or of methacrylic acid; oxyalkylesters of acrylic acid, methacrylic acid, fumaric acid, maleic acid, itaconic acid, crotonic acid; vinylesters of saturated carboxylic acids, such as vinylacetate; or esters of an ethylenically unsaturated carboxylic acid of a N-dialkyl alkanolamine, such as N,N-dimethyl ethanolamine methacrylate and its salts and its quaternary products.

Examples for further copolymerizable monomers vi) are vinylamides, such as N-vinylamides of a saturated carboxylic acid. These monomers are, for example, derived from an amide of a saturated aliphatic carboxylic acid, such as formic acid or acetic acid, carrying a N-vinyl group. Preferably these monomers carry at the amide-nitrogen a further functional group, such as a methylol group or a N-alkyl group.

Preferred N-vinylamides of a saturated carboxylic acid are N-vinyl acetamide, N-vinyl formamide, N-vinyl-N-methyl formamide, N-vinyl-N-methyl acetamide, N-methylol-N-vinyl formamide and N-methylol-N-vinyl acetamide. These monomers are incorporated via the N-vinyl groups into the copolymer and can be transformed by hydrolysis of the amide group into recurring structural units of formulae —$CH_2$—CH($NH_2$)— or —$CH_2$—CH(NHR)— or —$CH_2$—CH(NRR')—, wherein R and R' are monovalent organic groups.

Additional examples for monomers vi) are N-vinylamides of nitrogen-containing heterocylic compounds, preferably N-vinyl heterocyclic compounds with one or more ring nitrogen atoms, for example N-vinyl pyridine or N-vinyl imidazole. Furthermore, besides straight-chain and short-chain N-vinylamides referred to above, N-vinylamides of lactams can be used, such as N-vinylpyrrolidone or N-vinyl caprolactam.

Further examples for monomers vi) are crosslinkers, which are monomers with more than one ethylenically unsaturated group. Different compound classes can be used, such as bisamides, e.g. methylene-bis-acrylamide; bis-, tris- or tetraether derived from two-three- or fourvalent alcohols and from ethylenically unsaturated halides, e.g. trimethylolpropane diallylether, pentaerithritol-triallylether and tetraallyloxyethane; or esters of ethylenically unsaturated carboxylic acids with multivalent alcohols, e.g. di-, tri- or tetraacrylates or -methacrylates derived from ethyleneglycol, from trimethylolpropane or from pentaerythrite; or di-, tri- or polyamines which are substituted at the nitrogen atom with ethylenically unsaturated residues, such as N,N'-diallyl-ethylenediamine or triallylamine.

Crosslinker monomers, if present, typically are used in amounts between 0.01 and 2% by weight, preferably between 0.1 and 1.5% by weight, referring to the total amount of monomers used.

Copolymers preferably used in the stabilized aqueous polymer solutions or emulsions of this invention are derived from the following monomer combinations:
  acrylamide and/or methacrylamide, and vinylphosphonic acid, and AMPS and/or vinylsulfonic acid;
  acrylamide and/or methacrylamide, and vinylphosphonic acid, and AMPS and/or vinylsulfonic acid, and acrylic acid and/or methacrylic acid;
  acrylamide and/or methacrylamide, and vinylphosphonic acid, and AMPS and/or vinylsulfonic acid, and N-vinylformamide and/or N-vinylpyrrolidone; and
  acrylamide and/or methacrylamide, and vinylphosphonic acid, and AMPS and/or vinylsulfonic acid, and acrylic acid and/or methacrylic acid, and N-vinylformamide and/or N-vinylpyrrolidone.

Copolymers derived from acrylamide, vinylphosphonic acid, AMPS and optionally acrylic acid and/or methacrylic acid are especially preferred.

In a preferred embodiment of the present invention, synthetic polymer compositions are prepared both from hydrophilic and hydrophobic monomers. Hydrophilic monomer shall mean a monomer with a water solubility of at least 30 g/l water at 25° C. and at an atmospheric pressure of 1 bar. Hydrophobic monomer shall mean a monomer with a water solubility of less than 30 g/l water at 25° C. and at an atmospheric pressure of 1 bar.

Especially preferred are synthetic polymer compositions containing up to 50 weight % of the following hydrophobic ethylenically unsaturated compounds:
  vinylester, preferably vinyl acetate, vinyl propionate;
  vinylether, preferably vinyl methylether;
  alkylester of ethylenically unsaturated carboxylic acids;
  ethylenically unsaturated aromates, preferably styrene, vinyl toluidene; and
  ethylenically unsaturated hydrocarbons, preferably ethylene, propylene, butadiene.

In a further preferred embodiment of the present invention, the inventive synthetic polymer composition is a graft polymer of said hydrophilic and/or hydrophobic monomer compounds onto hydrophilic or hydrophobic polymer matrices. Preferred polymer matrices are polysaccharides, polyalkyleneoxides, polyvinyl-alcohols, polypropylenes and polybutadienes.

In a further preferred embodiment of the present invention, the inventive synthetic polymer composition is a crosslinked polymer derived from said hydrophilic and/or hydrophobic monomer compounds by addition of multiply ethylenically unsaturated compounds during polymerization. Preferred ethylenically unsaturated compounds are methylene bisacrylamide, tetra allyl oxiethane, trimethylol propane diallylether, methacrylic acid allylester and triallyl amine.

The stabilized aqueous polymer composition of this invention can be in the form of aqueous solutions of the polymer comprising groups which are capable of complex formation with ions; or they can be in the form of hydrogels derived from said aqueous solutions by using an ionic crosslinking agent; or they can also be in the form of a foam obtained by foaming the hydrogels with a foaming agent.

As another salient feature of the aqueous polymer composition of this invention, a sulfur dye or a combination of a sulfur dye with another compound comprising a heterocyclic system containing nitrogen and sulfur as ring heteroatoms is used.

Sulfur dyes are known for years and are used mainly for dyeing textile cellulosic materials or blends of cellulosic fibers with synthetic fibers such as polyacrylates, polyamides and polyesters. Most sulfur dyes are water insoluble. These dyes are known to produce robust dyings that have all round fastness except to chlorine.

Little is known about the structure of sulfur dyes, and therefore, they are classified in the Color Index 1975 ($3^{rd}$ edition, revised 1982) and the structure of the intermediates.

Sulfur dyes as used in this disclosure are ordinary or conventional sulfur dyes (most of which being insoluble) and furthermore include water soluble derivatives which are derived from conventional sulfur dyes, such as thiosulfonic derivatives (solubilized sulfur dyes. All these sulfur dyes are characterized by having as a structural unit at least one heterocyclic moiety with nitrogen and sulfur ring heteroatoms.

The Color Index International is a reference database and serves as a common reference database of manufactured color products for the skilled artisan.

Sulfur dyes are listed in the Color Index according to the system of Color Index Generic Names and Color Index Constitution Numbers. These numbers are prefixed with C.I. or CI, for example, CI 15510. A detailed record of products available on the market is presented under each Color Index reference.

For sulfur-bake dyes, for example, the following Color Index Numbers are available:

| Shade | C.I. designation name | C.I. designation number |
| --- | --- | --- |
| Orange | Sulfur Orange 1 | 53050 |
| Yellowish Brown | Sulfur Brown 26 | 53090 |
| Yellowish Brown | Sulfur Brown 12 | 53065 |
| Olive | Sulfur Green 12 | 53045 |
| Reddish Yellow | Sulfur Yellow 1 | 53040 |
| Brown | Sulfur Brown 52 | 53320 |

For polysulfide-bake dyes, for example, the following Color Index Numbers are available:

| Shade | C.I. designation name | C.I. designation number |
| --- | --- | --- |
| Yellow | Sulfur Yellow 9 | 53010 |
| Dull Reddish Brown | Sulfur Brown 56 | 53722 |
| Olive | Sulfur Green 11 | 53165 |
| Dull Green | Sulfur Green 1 | 53166 |

-continued

| Shade | C.I. designation name | C.I. designation number |
|---|---|---|
| Brown | Sulfur Brown 31 | 53280 |
| Dull Reddish Brown | Sulfur Brown 7 | 53275 |
| Brown | Sulfur Brown 6 | 53335 |
| Dull Green | Sulfur Green 9 | 53005 |
| Brownish Olive | Sulfur Brown 4 | 53210 |

For polysulfide-melt dyes, for example, the following Color Index Numbers are available:

| Shade | C.I. designation name | C.I. designation number |
|---|---|---|
| Bluish Black | Sulfur Black 9 | 53230 |
| Greenish Black | Sulfur Black 1 | 53185 |
| Bright Blue | Sulfur Blue 9 | 53430 |
| Reddish Blue to Bluish Violet | Sulfur Blue 7 | 53440 |
| Green | Sulfur Green 3 | 53570 |
| Bluish Green | Sulfur Green 2 | 53571 |
| Dull Bordeaux | Sulfur Red 3 | 53710 |
| Bordeaux | Sulfur Red 6 | 53720 |
| Blue to Reddish Navy | Vat Blue 42 | 53640 |
| Bluish Black | Sulfur Black 11 | 53290 |
| Bordeaux | Sulfur Red 10 | 53228 |
| Reddish Blue | Sulfur Blue 12 | 53800 |
| Dull Bluish Red | Sulfur Red 7 | 53810 |

For sulfurized vat dyes, for example, the following Color Index Numbers are available:

| Shade | C.I. designation name | C.I. designation number |
|---|---|---|
| Yellowish Brown | Vat dye | 58820 |
| Olive | Vat Green 7 | 58825 |
| Yellowish Orange | Vat Orange 21 | 69700 |
| Yellow | Vat Yellow 21 | 69705 |
| Dull Greenish Blue | Vat Blue 7 | 70305 |

Further known sulfur dyes are specified by the following Color Index Numbers:

| C.I. designation name | C.I. designation number |
|---|---|
| Sulfur Blue 5 | 53235 |
| Sulfur Blue 10 | 53470 |
| Sulfur Blue 15 | 53540 |
| Sulfur Green 8 | 53175 |
| Sulfur Brown 10 | 53055 |
| Sulfur Brown 15 | 53270 |
| Sulfur Brown 16 | 53285 |
| Sulfur Brown 20 | 53680 |
| Sulfur Brown 21 | 53065 |
| Sulfur Brown 38 | 53100 |
| Sulfur Brown 46 | 53015 |
| Sulfur Brown 51 | 53327 |
| Sulfur Brown 52 | 53320 |
| Sulfur Brown 60 | 53325 |
| Sulfur Black 6 | 53295 |
| Sulfur Black 7 | 53300 |
| Sulfur Black 8 | 53520 |

Further known sulfur dyes, without CI-specification are Sulfur Yellow 19, Sulfur Yellow 20, Sulfur Red 11, Sulfur Blue 11, Sulfur Green 19, Sulfur Green 26 and Sulfur Brown 93.

For solubilized sulfur dyes, for example, the following Color Index Numbers are available:

| C.I. designation name | C.I. designation number |
|---|---|
| Sol. Sulfur Red 6 | 53723 |
| Sol. Sulfur Blue 2 | 53481 |
| Sol. Sulfur Blue 7 | 53441 |
| Sol. Sulfur Blue 10 | 53471 |
| Sol. Sulfur Green 2 | 53572 |
| Sol. Sulfur Green 3 | 53573 |
| Sol. Sulfur Green 9 | 53006 |
| Sol. Sulfur Brown 10 | 53056 |
| Sol. Sulfur Brown 12 | 53724 |
| Sol. Sulfur Brown 15 | 53271 |
| Sol. Sulfur Brown 16 | 53286 |
| Sol. Sulfur Brown 21 | 53066 |
| Sol. Sulfur Brown 46 | 53016 |
| Sol. Sulfur Brown 51 | 53328 |
| Sol. Sulfur Brown 52 | 53321 |
| Sol. Sulfur Brown 60 | 53326 |
| Sol. Sulfur Black 1 | 53186 |

Further known solubilized sulfur dyes, without CI-specification are Sol. Sulfur Yellow 19, Sol. Sulfur Yellow 20, Sol. Sulfur Red 11, Sol. Sulfur Blue 11, Sol. Sulfur Green 19, Sol. Sulfur Green 26 and Sol. Sulfur Brown 93.

As preferred stabilizers for the compositions of the present invention the above-identified sulfur dyes are used.

Further preferred stabilizers for use in the present invention are Bunte salts of sulfur dyes prepared by the reaction of sulfur dyes with sulfites, such as sodium sulfite.

Sulfur dyes are described, for example, in "Kirk-Othmer", Volume 22, $3^{rd}$ edition (1983) on pages 168 to 183.

As another compound comprising a heterocyclic system containing nitrogen and sulfur as ring heteroatoms which may be used in combination with the sulfur dye in a stabilizer mixture, typically a condensed heterocyclic compound containing nitrogen and sulfur ring heteroatoms is used. This can be any system comprising at least two condensed rings and comprising at least one sulfur ring atom and at least one nitrogen ring atom. The number of ring atoms may vary, preferably between four and eight ring atoms, very preferably between five and six ring atoms. The at least one sulfur ring atom and the at least one nitrogen ring atom may be present in one ring or these heteroatoms may be present in different rings. Besides one or two nitrogen ring atoms and one or two sulfur ring atoms, additionally an oxygen atom may be present. Preferably only one sulfur ring atom and one or two nitrogen ring atoms are present in one ring. The condensed heterocyclic compound may be saturated or unsaturated, preferably at least one of the rings of the condensed heterocyclic compound being aromatic and very preferred all rings of the condensed heterocyclic compound being aromatic.

Examples of heterocyclic compounds containing nitrogen and sulfur ring heteroatoms are condensed systems of two rings, at least one of these rings containing at least one sulfur ring atom and at least one nitrogen ring atom and the second ring being linked via two adjacent ring atoms of the first ring to said first ring. Very preferably these heterocyclic systems are fully aromatic.

Additional examples of heterocyclic compounds containing nitrogen and sulfur ring heteroatoms are condensed systems of three rings, at least one of these rings containing at least one sulfur ring atom and at least one nitrogen ring atom, the second ring being linked via two adjacent ring atoms of the first ring to said first ring and the third ring either being linked via two adjacent ring atoms of the first ring to said first ring or being linked via a covalent bond to said first ring or to said second ring. Very preferably these heterocyclic systems are fully aromatic.

The condensed heterocyclic compounds containing nitrogen and sulfur ring heteroatoms are unsubstituted or are substituted by one or more substituents. If substituents are present preferably temperature stable substituents are used.

Examples of substituents are alkyl groups, such as $C_1$-$C_4$-alkyl, alkoxy groups, such as $C_1$-$C_4$-alkoxy, alkylthio groups, such as $C_1$-$C_4$-alkylthio, fluoroalkyl groups, such as $CF_3$, halogen atoms, such as chlorine or bromine, amino groups, which can be mono- or disubstituted, for example by alkyl, hydroxy groups, or aromatic groups, such as phenyl.

Suitable heterocyclic systems used as additional stabilizer together with a sulfur dye according to the present invention are further benzothiazole compounds. This term includes benzothiazole and benzothiazole derivatives.

Benzothiazole compounds are heterocyclic aromatic organic compounds containing nitrogen and sulfur as heteroatoms. Their aromaticity make them relatively stable, despite the presence of ring heteroatoms. Benzothiazole compounds have reactive sites which allow functionalization and show reactivity. Benzothiazoles are used in industries and research for many purposes. Examples thereof are the use as dyes, such as thioflavin, as pharmaceuticals, such as riluzole, as vulcanizing agents and as vulcanization accelerators. Benzothiazole compounds are also known as flame-retardant lubricants and are known to be excellent in reduction of metal wear and friction. Benzothiazole compounds have excellent extreme pressure properties and oilness properties. Further benzothiazole compounds show excellent oxidation stability and sludge production preventing property, free from lowering of oxidation stability even if used for a long time at high temperatures. These properties make them preferred stabilizers for the compositions of the present invention.

Examples of suitable benzothiazoles are: 2-(4-aminophenyl)-6-methyl-7-benzothiazole-sulfonic acid; 1-amino-4-(6-methyl-2-benzothiazolyl)-benzene; 2-amino-6-bromo-benzothiazole; 2-amino-6-chloro-benzothiazole; 2-amino-6-ethoxy-benzothiazole; 2-amino-6-methoxy-benzothiazole; 2-amino-6-methyl-benzothiazole; 2-amino-6-methylsulfonyl-benzothiazole; 2-amino-6-nitro-benzothiazole; 2-amino-6-tert.butyl-benzothiazole; 2-amino-6-thiocyano-benzothiazole; 2-amino-benzothiazole; 2-benzothiazolamine; 2,6-diamino-4,5,6,7-tetrahydro-benzothiazole; 4,5,6,7-tetrahydro-1,3-benzothiazol-2,6-diamine; 2-benzothiazoyl-2-amino-alpha-methoxyimino-4-thiazole-acetate; 2-(4-aminophenyl-5-sulfonic acid)-6-methyl-1,3-benzothiazole-7-sulfonic acid; 2,2-dithiobis-(benzothiazole); 2,6-dichloro-benzothiazole; 2-amino-benzothiazole-6-sulfonic acid; 2-amino-4-methyl-benzothiazole; 2-amino-5,6-dichloro-benzothiazole; 2-amino-5-methyl-benzothiazole; 2-mercapto-benzothiazole; 2-mercapto-5-chloro-benzothiazole; 2-methyl-5-chloro-benzothiazole; 2-methyl-benzothiazole; 2-phenyl-benzothiazole; 4-amino-2,1,3-benzothiadiazole; 4-amino-5-chloro-2,1,3-benzothiadiazole; 4-chloro-2-hydroxy-1,3-benzothiazole; 4-chloro-1,3-benzothiazole-2-one; 4-hydroxy-2-methyl-2H-1,2-benzothiazine-3-carboxylic acid isopropyl ester 1,1-dioxide; 5-bromo-2-mercapto-benzothiazole; 5-bromo-2-methyl-benzothiazole; 5-chloro-2-benzothiazolinone; 5-chloro-4-nitro-2,1,3-benzothiadiazole; 6-acetamido-2-amino-4,5,6,7-tetrahydro-benzothiazole; N-cyclohexyl-2-benzothiazole sulfonamide; 2-(P-aminophenyl)-6-methyl-benzothiazole; 4,5,6,7-tetrahydro-1,3-benzothiazole-2,6-diamine, 2-amino-6-propionamido-4,5,6,7-tetrahydro-benzothiazole, 2,6-diamino-4,5,6,7-tetrahydro-benzothiazole; 2-benzothiazoyl-2-amino-alpha-methoxyimino-4-thiazole-acetate, 1,2-benzisothiazol-3-one; 2-((1,3-benzothiazole-2-yl)-thio)succinic acid; 2-(4-aminophenyl-5-sulfonic-acid)-6-methyl-1,3-benzothiazole-7-sulfonic acid; 2-chloro-benzothiazole; 2-hydrazin-4-methyl-benzothiazole; and 4-hydroxy-2-methyl-2H-1,2-benzoisothiazol-2-aceticether-1,1-dioxide.

Preferred benzothiazole derivatives among these are 2-(4'-aminophenyl)-6-methyl-7-sulfonic-acid-benzothiazole and 2-(4'-aminophenyl)-6-methyl-benzothiazole.

Further preferred condensed heterocyclic systems containing nitrogen and sulfur as ring heteroatoms are products of the oxidative reaction of condensed heterocyclic compounds containing nitrogen ring atoms with sulfur or with alkali polysulfide, preferably with natrium polysulfide.

Further suitable compounds comprising a heterocyclic system containing nitrogen and sulfur as ring heteroatoms used as additional stabilizer together with a sulfur dye according to the present invention are unsubstituted phenothiazine and unsubstituted phenothiazine 5-oxide or a hydrohalogenide, preferably a hydrochloride of these compounds can be used. The 5-position in the phenothiazine system is the position of the ring-nitrogen atom.

Besides the unsubstituted phenothiazine compounds, the 5-oxide- or hydro-halogenide-substituted derivatives of these compounds may be used. The substitution can be at any position of the ring where substitution is possible and one or more substituents can be present. Typical substituents are alkyl groups, alkoxy groups, aryl groups, aroyl groups, carboxyl groups, carboxylic acid ester groups, carboxylic acid amide groups, halogen atoms, hydroxyl groups, nitro groups or a combination of two or more of these groups.

Preferred phenothiazine compounds are selected from the group consisting of phenothiazine, alkyl-substituted phenothiazine, aryl-substituted phenothiazine, aroyl-substituted phenothiazine, carboxyl-substituted phenothiazine, halogen-substituted phenothiazine, N-(dialkylaminoalkyl)-substituted phenothiazine, phenothiazine-5-oxide, alkyl-substituted phenothiazine-5-oxide, aryl-substituted phenothiazine-5-oxide, aroyl-substituted phenothiazine-5-oxide, carboxyl-substituted phenothiazine-5-oxide, halogen-substituted phenothiazine-5-oxide, N-(dialkylaminoalkyl)-substituted phenothiazine-5-oxide and the hydrochlorides of these compounds.

Especially preferred phenothiazine compounds are selected from the group consisting of phenothiazine, 3-phenylphenothiazine, N-phenylphenothiazine, phenothiazine-5-oxide, 10,10'-diphenylphenothiazine, N-benzoylphenothiazine, 7-benzoylphenothiazine, 3,7-difluorophenothiazine, N-ethylphenothiazine, 2-acetyl-phenothiazine, 3,7-dioctylphenothiazine, N-methylpheno-thiazine-5-oxide, N-acetylphenothiazine, N-(2-diethylaminoethyl)-phenothiazine, N-(2-dimethylamino-propyl)-phenothiazine, N-(2-dimethylaminopropylphenothiazine)-hydrochloride, N-octadecyl-phenothiazine and N-propylphenothiazine.

In a further preferred embodiment of this invention, the combination of at least a sulfur dye as stabilizer and at least a phenothiazine compound as additional stabilizer is used for stabilizing a gelled polymer. The mixing ratio is not limited; each ratio for their combination is convenient. Preferably the weight mixing ratio of sulfur dye:phenothiazine compound is from 0.1:0.9 up to 0.9:0.1.

In a still further preferred embodiment of this invention, the combination of at least a sulfur dye as stabilizer and at least a benzothiazole compound as additional stabilizer is used for stabilizing a gelled polymer. The mixing ratio is not limited;

each ratio for their combination is convenient. Preferably the weight mixing ratio of sulfur dye:benzothiazole compound is from 0.1:0.9 up to 0.9:0.1.

The amount of stabilizer alone or in combination with an additional stabilizer is calculated such that a desirable stabilizing effect of said aqueous polymer composition is obtained. In general, minor amounts of the said stabilizer or of the said combination are used, for example amounts of less than 20% by weight, referring to the total composition.

Preferably 10 ppm to 10% by weight of a stabilizer or of a mixture of stabilizers in the final polymer are used, very preferred 80 ppm to 5% by weight.

As many of the sulfur dyes and other heterocyclic compounds containing nitrogen and sulfur ring heteroatoms are water insoluble, said compounds are either dispersed in the aqueous solution or in the hydrogel formed therefrom; or solvents for the participating compounds, such as alcohols, are added to the aqueous solution of the polymer. Another possibility reflects the addition of the sulfur dye alone or together with the other heterocyclic compounds containing nitrogen and sulfur ring heteroatoms to a precursor emulsion, preferably a W/O precursor emulsion, which releases the polymer after mixing with water to form a stabilized aqueous solution of a polymer.

As is well known, most polymers used in the aqueous polymer composition of this invention are typically crosslinkable in an aqueous medium by a wide variety of complexing ions. These ionically crosslinkable polymers have a remarkable capacity to thicken aqueous liquids and thus to form gels. Any suitable crosslinking agent can be used that is effective at crosslinking the aqueous polymer solution. Preferably the ionic crosslinking agent is selected from borates, or from ions from multivalent metals, such as zirconium, aluminum, boron, titanium, chrome, iron, or magnesium. The crosslinking agent is optionally encapsulated. Suitable crosslinking agents are known to those skilled in the art.

Especially preferred are embodiments in which the aqueous solutions of the polymer are crosslinked by adding zirconium and/or titanium.

Additional high temperature stabilizers, besides the sulfur dye or the combination of the sulfur dye with other heterocyclic compounds containing nitrogen and sulfur ring heteroatoms, may also be present.

In another embodiment of the invention, the aqueous polymer composition may contain additives including, but not necessarily limited to, viscosifying agents, water wetting surfactants, clay stabilization additives, scale dissolvers, biopolymer degradation additives, pH buffers, biocides, surfactants, non-emulsifiers, anti-foamers, inorganic scale inhibitors, colorants, clay control agents, time delayed degrading agents and other common components.

The invention is also embodied by adding at least a sulfur dye defined above or a combination of at least a sulfur dye and at least another heterocyclic compound containing nitrogen and sulfur ring heteroatoms to an emulsion, preferably a W/O emulsion in which the water phase comprises polymer containing groups which are capable of complex formation with ions. The organic phase of said W/O emulsion comprises organic solvents which are not or are only partially miscible with the water phase.

The invention also relates to a method of stabilizing an aqueous solution or a water-in-oil emulsion, said solution or emulsion containing a polymer containing groups which are capable of complex formation with ions, which method comprises adding a stabilizing amount of at least a sulfur dye defined above or a combination of at least a sulfur dye and at least another heterocyclic compound containing nitrogen and sulfur ring heteroatoms to said aqueous solution or to said water-in-oil emulsion to result in a stabilization against thermal degradation of said polymer.

In still another embodiment, the invention relates to the use of a sulfur dye defined above or of a combination of at least a sulfur dye and at least another heterocyclic compound containing nitrogen and sulfur ring heteroatoms to stabilize a polymer comprising groups which are capable of complex formation with ions, or to stabilize a gelled polymer obtained from said polymer by the action of ions, against thermal degradation.

In further embodiments the invention relates to the use of a sulfur dye as a stabilizer defined above or a combination of at least a sulfur dye and at least another heterocyclic compound containing nitrogen and sulfur ring heteroatoms to stabilize polymers against thermal degradation, said polymers being used:

as fluid loss additives in drilling muds;
as fluid loss additives in cementing slurries;
in polymer solutions for tertiary oil recovery;
in polymer compositions for water control;
in polymer compositions for acidizing processes;
as cooling lubricants in metal working; and
as friction reducers.

The following examples are for illustration purposes only and are not intended to limit the scope of the invention.

The following working examples demonstrate the manufacture of the stabilized aqueous solutions of this invention. The abbreviations used in the examples and in the included tables have the following meanings:

AM=acrylamide
AMPS=2-acrylamido-2-methylpropane sulfonic acid
VPA=vinylphosphonic acid

EXAMPLES

The viscosity measurements were carried out with a Haake M5 viscosimeter using 450 rpm at 25° C.

The preparation of the polymer is illustrated by the following gel polymerization method.

200 ml of demineralized water, 35 g of AMPS, 64 g of AM and 1 g of VPA were initially introduced into a polymerization flask of 1 l capacity, equipped with stirrer, reflux condenser, gas inlet tube, thermocouple and pH meter with combined glass electrode, and a pH of 7.2 was established with 19.4 g of aqueous 22% ammonia solution. Cooling was effected to 20° C., the stirrer was removed and the atmospheric oxygen was expelled with nitrogen. Thereafter, 4 g of a 10% ammonia persulfate solution were added and, after 10 minutes, the gas inlet tube was removed and the nitrogen stream was stopped. The reaction started immediately. After standing overnight, a highly viscous to stiff, clear gel was obtained. After cutting, the gel was dried and this product was milled resulting in a polymer powder.

Comparative Example 1

2 g of the copolymer, comprising AM (64 w %), AMPS sodium salt (35 w %) and VPA sodium salt (1 w %), prepared by polymerization as described above, was dissolved in 198 ml of deionized water to give a 1 w % polymer solution. The viscosity of this solution was 92 mPas. The polymer solution was kept in a VA autoclave under stirring for two hours at 160° C. After cooling down the solution to room temperature (20° C.), the measured viscosity was 52 mPas. After a further period of heating, the polymer solution was kept again in a VA autoclave under stirring for another two hours at 160° C. Again, the viscosity has been determined after cooling down and showed a value of 16 mPas.

Examples 1-4

For investigation of the influence of the stabilizer concentration on the stabilizing effect of the polymer solution, the following examples were carried out.

2 g of the copolymer, comprising AM (64 w %), AMPS sodium salt (35 w %) and VPA sodium salt (1 w %), prepared by polymerization as described above, was dissolved in 198 ml of deionized water to give a 1 w % polymer solution. To this solution, the stabilizer was added in different concentrations.

As stabilizer, solubilized Sulfur Black 1 (CI 53186) was used. Viscosity measurements were carried out immediately after addition of the stabilizer (Sol. Sulfur Black 1), 2 hours after the polymer solution was kept at 160° C. constantly, and again after a further 2 hours during which the polymer solution was kept at 160° C. The viscosity measurements were all carried out after cooling to room temperature. The results are summarized in Table 1.

TABLE 1

Stabilizing with Different Concentrations

| Example No. | Concentration of stabilizer [mg/g polymer 100%] | Viscosity [mPas] | | |
|---|---|---|---|---|
| | | 0 hours | 2 hours | 4 hours |
| Example 1 | 12.5 | 86.4 | 84.2 | 105.6 |
| Example 2 | 25.0 | 89.3 | 88.5 | 100.1 |
| Example 3 | 50.0 | 89.6 | 91.4 | 102.8 |
| Example 4 | 100.0 | 89.6 | 126.0 | 130.9 |

According to the present invention, the stabilizing effect is observed using Sol. Sulfur Black 1, CI 53186, which is a solubilized sulfur dye. As shown in Table 1, a stabilizing effect is obtained using a very small amount of stabilizer, which is added to the copolymer solution. Independent from the concentration of the added stabilizer, the viscosity shows almost the same value up to a stabilizer concentration of 100 mg/g.

Example 5

For investigation of the influence of the kind of stabilizer compound, examples were carried out using different stabilizer compositions at concentrations in the range between 25 to 30 mg/g polymer. Viscosity measurements were carried out according to the description in the previous examples 1 to 4. The results are summarized in Table 2:

TABLE 2

Stabilizing With Different Stabilizer Compositions

| Example No. | Stabilizer | Concentration of Stabilizer [mg/g polymer] | Viscosity [mPas] | | |
|---|---|---|---|---|---|
| | | | 0 hours | 2 hours | 4 hours |
| Example 3 | Sol. Sulfur Black 1 CI 53186 | 25.0 | 89.3 | 88.5 | 100.1 |
| Example 5 | Phenothiazine + sol. Sulfur Green 2 CI 53572 (1:1 by Weight) | 26.6 | 96.6 | 94.7 | 93.9 |

As shown in Table 2, Solubilized Sulfur Black 1 and the combination of Sulfur Green 2 together with phenothiazine show similar results in stabilizing the copolymer composition.

Comparative Examples 2-4

To demonstrate the benefits of sulfur dyes or the combination of sulfur dyes with condensed heterocyclic systems containing nitrogen and sulfur ring heteroatoms, tests were carried out with alternative aromatic ring systems without nitrogen and sulfur ring heteroatoms. Viscosity measurements were carried out according to the description in the examples 1 to 5 as described above.

The results are summarized in Table 3:

TABLE 3

Stabilizers Without Nitrogen/Sulfur Heterocycles

| Comparative Example No. | Stabilizer | Concentration of Stabilizer [mg/g polymer] | Viscosity [mPas] | | |
|---|---|---|---|---|---|
| | | | 0 hours | 2 hours | 4 hours |
| 2 | 2,6-di-tert.-butyl-4-methylphenol | 29.5 | 99.4 | 6.7 | 6.3 |
| 3 | 4-tert-butylbrenz-catechin | 22.2 | 100.7 | 7.5 | 8.1 |
| 4 | antraquinone | 27.9 | 98.0 | 7.7 | 8.9 |

Obviously, ring systems including condensed ring systems without sulfur and nitrogen ring atoms show only an initial stabilizing effect. After storage at elevated temperatures, the viscosity drops rapidly and results in a copolymer solution of low viscosity.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. A stabilized aqueous polymer composition containing:
A) a stabilizing amount of at least a sulfur dye stabilizer effective to stabilize the aqueous polymer composition against thermal degradation; and B) at least one polymer comprising groups which are capable of complex formation with ions;

wherein the at least one polymer is selected from the group consisting of
  a solvatable polysaccharide and
  a synthetic polymer comprising at least two monomer units selected from the group consisting of: an amide of an ethylenically unsaturated carboxylic acid; an ethylenically unsaturated phosphonic acid; and an ethylenically unsaturated sulfonic acid; and wherein the sulfur dye stabilizer is provided in an amount of from 10 parts of stabilizer per million parts of polymer up to 10% by weight of stabilizer based on the mass of polymer.

2. The stabilized aqueous polymer composition according to claim 1, wherein said polymer has a molecular weight of at least $10^4$ Daltons.

3. The stabilized aqueous polymer composition according to claim 1, wherein said polymer is selected from the group consisting of starch and its derivatives, a cellulosic derivative, a guar gum and its derivatives, an alginate, a carrageenan, a tragacanth gum, a glucan gum, and a xanthan gum.

4. The stabilized aqueous polymer composition according to claim 1, wherein said polymer is a synthetic polymer comprising a copolymer of a combination of monomers selected from the group consisting of:
  at least one amide of an ethylenically unsaturated carboxylic acid, at least one ethylenically unsaturated phosphonic acid and at least one ethylenically unsaturated sulfonic acid;
  at least one amide of an ethylenically unsaturated carboxylic acid, at least one ethylenically unsaturated phosphonic acid, at least one ethylenically unsaturated sulfonic acid and at least one ethylenically unsaturated carboxylic acid;
  at least one amide of an ethylenically unsaturated carboxylic acid, at least one ethylenically unsaturated phosphonic acid, at least one ethylenically unsaturated sulfonic acid, and at least one N-vinylamide;
  at least one amide of an ethylenically unsaturated carboxylic acid, at least one ethylenically unsaturated phosphonic acid, at least one ethylenically unsaturated sulfonic acid, at least one ethylenically unsaturated carboxylic acid, and at least one N-vinylamide;
  at least one amide of an ethylenically unsaturated carboxylic acid, at least one ethylenically unsaturated phosphonic acid, at least one ethylenically unsaturated sulfonic acid, at least one ethylenically unsaturated carboxylic acid, and at least one allylamine; and
  at least one amide of an ethylenically unsaturated carboxylic acid, at least one ethylenically unsaturated phosphonic acid, at least one ethylenically unsaturated sulfonic acid, at least one ethylenically unsaturated carboxylic acid, and at least one N-dialkyl alkanolamine.

5. The stabilized aqueous polymer composition according to claim 4, wherein said synthetic polymer is a copolymer derived from the following combination of monomers: acrylamide, vinylphosphonic acid, 2-acrylamido-2-methylpropane-sulfonic acid and optionally acrylic acid and/or methacrylic acid; or wherein said synthetic polymer is a copolymer containing besides structural units derived from hydrophilic monomers of claim 4 up to 50 weight % of structural units derived from the following hydrophobic ethylenically unsaturated monomers:
  vinylester;
  vinylether;
  alkylester of ethylenically unsaturated carboxylic acids;
  ethylenically unsaturated aromates; and
  ethylenically unsaturated hydrocarbons.

6. The stabilized aqueous polymer composition according to claim 1, wherein said synthetic polymer is a graft polymer of hydrophilic and hydrophobic monomer compounds onto hydrophilic or hydrophobic polymer matrices.

7. The stabilized aqueous polymer composition according to claim 1, wherein said synthetic polymer is a crosslinked polymer derived by addition of monomers with at least two ethylenically unsaturated groups in a molecule during polymerization.

8. The stabilized aqueous polymer composition according to claim 1, wherein said sulfur dye stabilizer is a sulfur dye, a mixture of sulfur dyes or a sulfur dye combined with other condensed heterocyclic compounds containing nitrogen and sulfur ring systems.

9. The stabilized aqueous polymer composition according to claim 1, wherein said sulfur dye is a product of the oxidative reaction of heterocyclic compounds containing nitrogen ring atoms and optionally containing sulfur ring atoms with sulfur and/or with natrium polysulfide.

10. The stabilized aqueous polymer composition according to claim 9, wherein the sulfur dye is a sulfur-bake dye; or wherein the sulfur dye is a polysulfide-bake dye; or wherein the sulfur dye is a polysulfide-melt dye; or wherein the sulfur dye is a sulfurized vat dye; or wherein the sulfur dye is a sulfur dye without CI specification; or wherein the sulfur dye is a solubilized sulfur dye or of combinations of at least two or more thereof.

11. The stabilized aqueous polymer composition according to claim 1, wherein the stabilizer is a Bunte salt of sulfur dyes prepared by the reaction of sulfur dyes with sulfites.

12. The stabilized aqueous polymer composition according to claim 8, wherein said condensed heterocyclic compound comprises a heterocyclic system containing nitrogen and sulfur as ring heteroatoms and is selected from the group consisting of phenothiazine, alkyl-substituted phenothiazine, aryl-substituted phenothiazine, aroyl-substituted phenothiazine, carboxyl-substituted phenothiazine, halogen-substituted phenothiazine, N-(dialkylaminoalkyl)-substituted phenothiazine, phenothiazine-5-oxide, alkyl-substituted phenothiazine-5-oxide, aryl-substituted phenothiazine-5-oxide, aroyl-substituted phenothiazine-5-oxide, carboxyl-substituted phenothiazine-5-oxide, halogen-substituted phenothiazine-5-oxide, N-(dialdylaminoalkyl)-substituted phenothiazine-5-oxide and the hydrochlorides of these compounds.

13. The stabilized aqueous polymer composition according to claim 8, wherein said condensed heterocyclic compound comprises a heterocyclic system containing nitrogen and sulfur as ring heteroatoms and is selected from the group consisting of benzothiazoles, alkyl-substituted benzothiazoles, aryl-substituted benzothiazoles, aroyl-substituted benzothiazoles, sulfonyl-substituted benzothiazoles, halogen-substituted benzothiazoles, amino-substituted benzothiazoles, and mercapto-substituted benzothiazoles.

14. The stabilized aqueous polymer composition according to claim 1, wherein the polymer is gelled by ionic crosslinking.

15. The stabilized aqueous polymer composition according to claim 1, wherein the stabilized aqueous polymer composition is obtained by addition of the sulfur dye stabilizer or of the sulfur dye stabilizer and a phenothiazine compound in the form of a powder, of a dispersion or of an emulsion to the at least one polymer followed by ionic crosslinking of said polymer.

16. A method of stabilizing an aqueous polymer system against thermal degradation comprising:
(a) preparing an aqueous polymer composition comprising a polymer with groups capable of complex formation with ions; and
(b) stabilizing the aqueous composition with a sulfur dye or a combination of at least one sulfur dye and another heterocyclic system containing nitrogen and sulfur ring heteroatoms;
wherein the polymer is selected from the group consisting of:
a solvatable polysaccharide and a synthetic polymer comprising at least two monomer units selected from the group consisting of: an amide of an ethylenically unsaturated carboxylic acid; an ethylenically unsaturated phosphonic acid; and an ethylenically unsaturated sulfonic acid.

17. The method of stabilizing an aqueous polymer system according to claim 16, wherein the stabilized composition is used as a tertiary oil recovery fluid, as a fluid loss additive in drilling muds, as a fluid loss additive in cementing slurries, in polymer compositions for water control, as a cooling lubricant in metal working, in polymer compositions for acidizing processes, or as a friction reducer.

18. A method of recovering oil comprising using a tertiary oil recovery fluid comprising the stabilized aqueous polymer composition of claim 1.

19. A method of recovering oil comprising using a drilling mud comprising the stabilized aqueous polymer composition of claim 1.

20. A method of recovering oil comprising using a cement slurry comprising the stabilized aqueous polymer composition of claim 1.

21. A method of recovering oil comprising using a hydraulic fracturing fluid comprising the stabilized aqueous polymer composition of claim 1.

22. The stabilized aqueous polymer composition according to claim 3, wherein said polymer is a cellulosic derivative and wherein further said cellulosic derivative is a cellulose ether selected from the group consisting of carboxymethyl cellulose and hydroxyethyl cellulose.

23. The stabilized aqueous polymer composition according to claim 3, wherein said polymer is a guar gum derivative and wherein further said guar gum derivative is a guar gum ether.

* * * * *